United States Patent [19]

Atsuta et al.

[11] Patent Number: 4,896,951
[45] Date of Patent: Jan. 30, 1990

[54] LENS MOUNT ASSEMBLY

[75] Inventors: Toshikatsu Atsuta; Hirotaka Shiroshita; Naohiro Hisamoto; Takayuki Kubodera; Kazuo Ishikawa; Masao Tsujimura, all of Tokyo; Eiichi Mochizuki, Nagano, all of Japan

[73] Assignee: Kyocera Corporation, Kyoto, Japan

[21] Appl. No.: 212,879

[22] Filed: Jun. 29, 1988

[30] Foreign Application Priority Data

Jul. 16, 1987 [JP] Japan .............................. 62-109260[U]
Jul. 31, 1987 [JP] Japan ................................ 62-116667

[51] Int. Cl.⁴ .......................... G02B 15/14; G02B 7/04
[52] U.S. Cl. ..................................... 350/429; 350/255; 354/286
[58] Field of Search ............... 350/429, 255, 247, 257, 350/430; 354/286, 295, 195.11, 195.12, 195.1

[56] References Cited

U.S. PATENT DOCUMENTS

| | | | |
|---|---|---|---|
| 3,158,076 | 11/1964 | Back et al. ........................... | 350/429 |
| 3,514,179 | 5/1970 | Koeber, Jr. .......................... | 350/247 |
| 4,076,388 | 2/1978 | Bennett et al. ....................... | 350/429 |
| 4,297,002 | 10/1981 | Meatabi ............................... | 350/255 |
| 4,557,576 | 12/1985 | Drefchinski ......................... | 350/255 |

*Primary Examiner*—Bruce Y. Arnold
*Assistant Examiner*—Loha Ben
*Attorney, Agent, or Firm*—Spensley Horn Jubas & Lubitz

[57] ABSTRACT

The present invention relates to a lens mount assembly for use in photographic camera, video camera and other various optical instruments. Usually, electric drive units for focussing and zooming, respectively, are gear-coupled to such lens mount assembly and drive torque from these drive units often causes deviation, deflection and eccentricity of the lens mount assembly, and additionally causes unreliable gear-coupling of the drive units and deteriorated image forming capability of the optical systems. The present invention provides a barrel supporting mechanism adapted to slidably support a front section of the lens mount assembly in order to overcome these problems. The present invention further provides the lens mount assembly with a simplified dust-proof mechanism utilizing a floating ring.

7 Claims, 4 Drawing Sheets 4,896,951

LENS MOUNT ASSEMBLY

BACKGROUND OF THE INVENTION 1. (Field of the Invention)

The present invention relates to a lens mount assembly for use in optical instruments such as photographic camera, compact cinecamera, video camera, copying machine and enlarger.

2. (Prior Art)

The zoom lens mount assembly, a specific type of the lens mount assembly, is well known.

The zoom lens mount assembly generally comprises a cam barrel including an elongate cam track formed through its cylindrical wall, and a movable barrel having a cam follower (specifically, a pin provided with a roller) slidably inserted into said track and telescopically received into said cam barrel, said movable barrel carrying therein a variable magnification lens and a compensating lens, wherein said cam barrel may be rotatably driven to move said movable barrel along the optical axis for adjustment of the optical magnification.

With such zoom lens mount assembly, the movable barrel is often provided at its front end with a focussing ring helicoidally threaded thereon so that said focussing ring carries a front lens assembly and may be rotated to adjust a position of said front lens assembly and thereby to achieve a desired focal adjustment.

In the zoom lens mount assembly which is recently available, said cam barrel is rotatably driven by an electric motor coupled by a gear to said cam barrel for automatic control of zooming and simultaneously said focussing ring is rotatably driven by another electric motor coupled by a gear to said focussing ring for automatic control of focussing.

In case of the well known zoom lens mount assembly as above mentioned, there is a problem particularly with respect to the gear coupling of the focussing ring projecting forward from the lens mount assembly, since the driving units respectively including the components such as the electric motors and the coupling gears are mounted on a stationary plate on which the lens mount assembly is mounted.

More specifically, the focussing ring is provided with a gear for focal adjustment and this gear is adapted to be engaged with the coupling gear of the associated driving unit. However, the position at which said focussing gear is engaged with the coupling gear of the driving unit is so spaced from said stationary plate that the support member for the focussing ring and the driving unit is subject to a deflection as a driving torque exerted upon the focussing ring increases, for example, said focussing ring is rotated to the point at infinity or the nearest position and, as a result, the engagement depth of the gear becomes shallow.

This is due to insufficient rigidity of the support member for the focussing ring and the driving unit, especially in the case when such support member is made of synthetic resin. This sometimes prevents a driving force from being accurately transmitted.

Upon occurrence of this effect, an image formation quality of the lens is disadvantageously deteriorated due to a deflection of the focussing ring.

Furthermore, the zoom lens mount assembly of prior art as has been described above is of an arrangement such that the movable barrel is moved along the optical axis for zooming and the focussing ring is rotated for focal adjustment. Such feature necessarily leads to increase of the movable parts and dust-proof means for these parts must be complicated.

SUMMARY OF THE INVENTION

The present invention relates to a lens mount assembly for use in optical instruments such as photographic camera, compact cinecamera, video camera, copying machine and enlarger.

A primary object of the present invention is to avoid deviation, deflection or eccentricity of the lens mount assembly possibly occurring when a driving force is exerted upon the lens mount assembly.

This object is achieved, according to the present invention, by provision of a barrel supporting mechanism comprising a support member secured directly to a body of the associated optical instrument or to a suitable mounting member by which the lens mount assembly is attached to said body so as to project forward from said body of the optical instrument and having a receiving opening for slidably receiving a front section of said lens mount assembly.

A second object of the present invention is to develop, as dust-proof means for the lens mount assembly, a simplified dust-proof mechanism utilizing a floating ring.

This object is achieved, in accordance with the present invention, by provision of a dust-proof mechanism comprising the lens mount assembly fixed to the body of the associated optical instrument, a face plate defined by the optical instrument itself or a front cover thereof having an opening with its inner peripheral edge closely surrounding the outer periphery of said lens mount assembly, and the floating ring interposed between the outer periphery of said lens mount assembly and said inner peripheral edge of said opening formed in said face plate, wherein said floating ring has an inner peripheral surface adapted to be in slidable contact with said outer peripheral surface of said lens mount assembly and a circumferential groove formed in its outer periphery for slidably receiving said peripheral edge of said opening but with a certain gap left therebetween.

DESCRIPTION OF THE PREFERRED EMBODIMENTS

Details of the present invention will be readily apparent from the following description of the embodiments in reference with the accompanying drawing.

Figure 1:
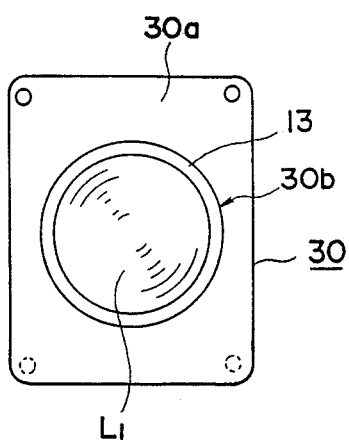
FIGS. 1 and 2 schematically show a zoom lens mount assembly as an embodiment of the present invention, FIG. 1 being a front view and FIG. 2 being a side view, respectively.
Figure 2:
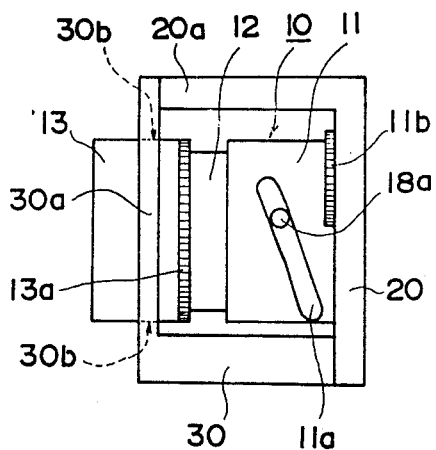

Referring to FIGS. 1 and 2 schematically showing a zoom lens mount assembly for a photographic camera as an embodiment of the present invention, reference numeral 10 designates a zoom lens mount assembly, reference numeral 20 designates a lens mounting plate carrying said zoom lens mount assembly 10, and reference numeral 30 designates a support plate having a barrel receiving opening.

The zoom lens mount assembly 10 includes a cam follower slidably inserted into a cam track 11a formed in a cam barrel 11, a movable barrel 12 adapted to be moved along an optical axis in operative association with rotation of the cam barrel 11, and a focussing ring 13 helicoidally threaded on a front end of the movable barrel 12 and serving as a rotatable frame. This focussing ring 13 carries therein a front lens assembly $L_1$ of a zooming lens.

The above-mentioned lens mounting plate 20 is a molded piece of inverted L-shape as shown, to which said zoom lens mount assembly 10 is mounted integrally therewith. This lens mounting plate 20 is fixed to a camera body or the like so that the zoom lens mount assembly extends forward from the camera body or the like.

The above-mentioned support plate 30 is a molded piece of L-shape as shown and includes a vertical web 30a formed with a circular barrel receiving opening 30b adapted to slidably receive the focussing ring 13 of the zoom lens mount assembly 10.

The support plate 30 is connected at an end thereof to the lens mounting plate 20 by screws and thereby a frame is formed from these lens mounting plate 20 and support plate 30 so as to surround the zoom lens mount assembly 10.

A driving unit (not shown) including an electric motor and a coupling gear is mounted on the vertical web 30a of the support plate 30 so that the driving unit is located beneath a horizontal web 20a of the lens mounting plate 20 and a gear of this unit is engaged with a focussing gear 13a of the focussing ring 13. It should be understood that the lens mounting plate 20 is provided with another similar driving unit having its gear being engaged with a zooming gear 11b of the cam barrel 11.

With the zoom lens mount assembly 10 supported by said support plate 30 in a fashion as mentioned above, the focussing ring 13 which is mounted to the front end of the movable barrel 12 is slidably moved through the barrel receiving opening 30b of the support plate 30 along the optical axis during zooming operation as the cam barrel 11 is rotated to move the movable barrel 12.

Rotation of the focussing ring 13 by the driving unit causes the front lens assembly $L_1$ to be displaced for focussing control. During this focussing control, the focussing ring 13 is rotated with its outer peripheral being kept in contact with the inner edge of the barrel receiving opening 30b and, therefore, any deviation and deflection of the focussing ring 13 can be avoided even when a relatively high driving torque is exerted on the focussing ring 13. Accordingly, it is possible to assure a reliable engagement of the focussing gear and a proper image forming capability of the front lens assembly $L_1$.

Figure 3:
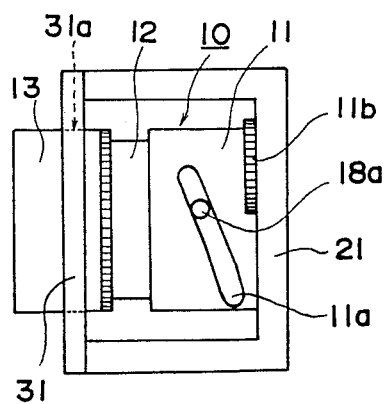
FIG. 3 is a view similar to FIG. 2 but showing another embodiment of the present invention.

Shapes and configuration of the lens mounting plate 20 and the support plate 30 are not limited to those as shown by FIGS. 1 and 2 and it is possible to provide a frame consisting of a lens mounting plate 21 of square U-shape and a support plate 31 of I-shape formed with a barrel receiving opening 31a, as seen in FIG. 3. The support plate 30 or 31 may be fixed to the camera body or the like instead of being fixed to the lens mounting plate 20 or 21, respectively.

Figure 5:
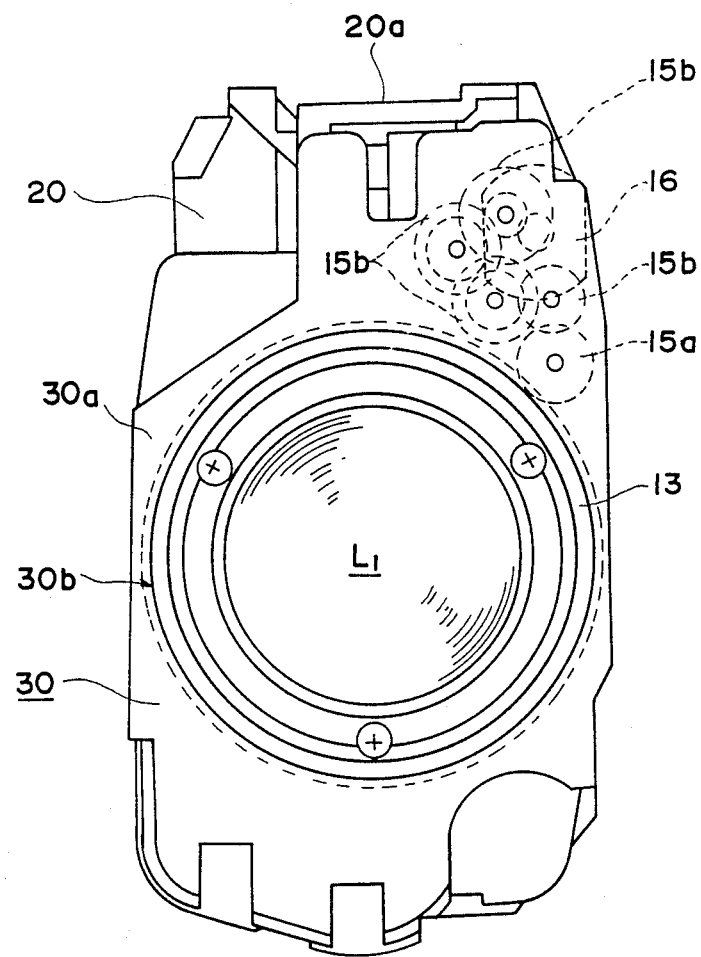
FIGS. 5 and 6 show a specific example corresponding to the embodiment shown by FIGS. 1 and 2, FIG. 5 being a front view and FIG. 6 being a side view partially broken away of this lens mount assembly, respectively.
Figure 6:
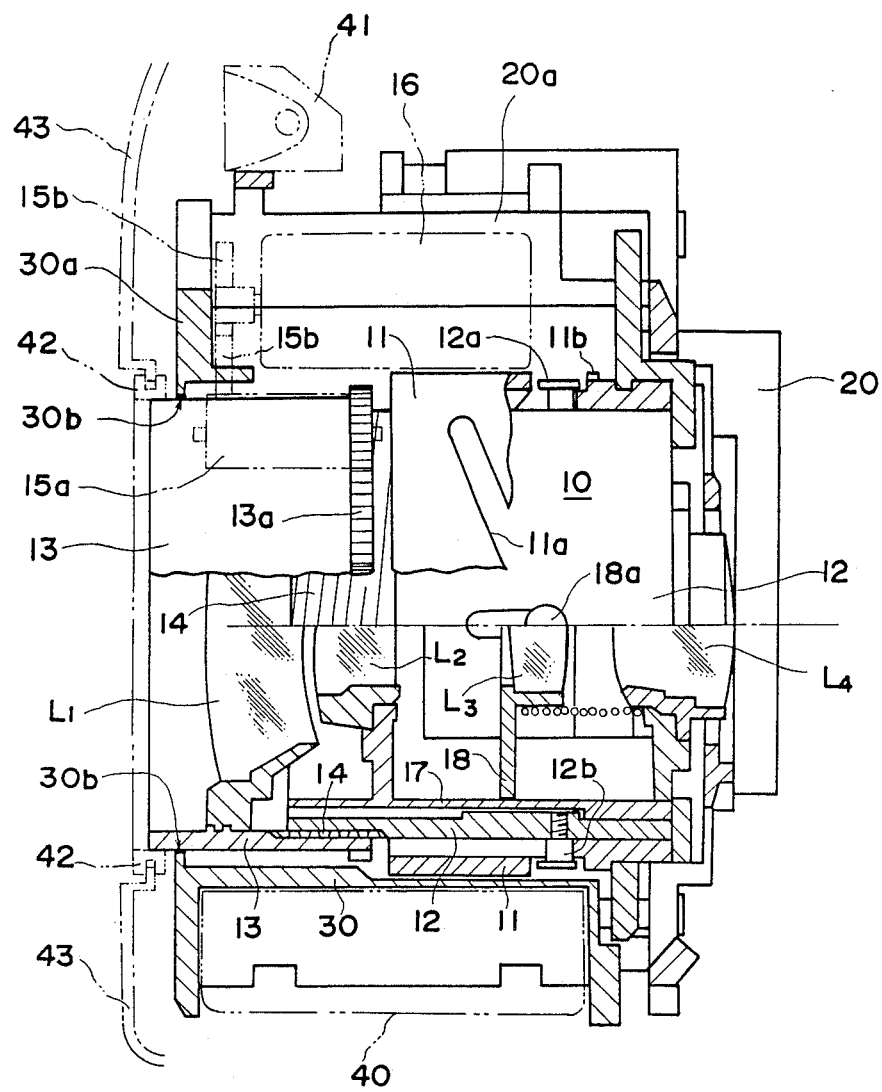

FIGS. 5 and 6 show a specific example corresponding to the embodiment shown by FIGS. 1 and 2, FIG. 5 being a front view and FIG. 6 being a side view, as partially broken away. Similar parts to those of FIGS. 1 and 2 are designated with the similar reference numerals.

As shown, the focussing ring 13 carrying the front lens assembly $L_1$ is helicoidally threaded (14) on the movable barrel 12 and coupling gears 15a are engaged with the focussing gear 13a. These coupling gears 15a are mounted to reduction gears 15b on the vertical web 30a of the support plate 30 and these gears constitute together with an electric motor 16 a drive unit serving to rotate the focussing ring 13 for focussing control. The electric motor 16 is also mounted on the vertical web 30a of the support plate 30.

The movable barrel 12 is interposed between the cam barrel 11 and the stationary barrel 17 and adapted to be moved along the optical axis (horizontally as seen in FIG. 6) as cam followers 12a, 12b are urged by the associated cam tracks. This movable barrel 12 carries therein a rear lens assembly $L_4$ which is displaced integrally with the front lens assembly $L_1$ as said movable barrel 12 is moved.

Reference $L_3$ designates a compensating lens carried by another movable barrel 18 and this compensating lens $L_3$ is displaced as a cam follower 18a is urged by the cam track 11a of the cam barrel 11.

Reference $L_2$ designates a stationary lens assembly carried by the stationary barrel 17.

This specific example additionally includes a source battery 40, a capacitor and other components, and the lens mounting plate 20 which is, in turn, provided with various units such as the drive unit (not shown) adapted for rotatable drive of the cam barrel 11 and a flash unit 41.

Figure 4:
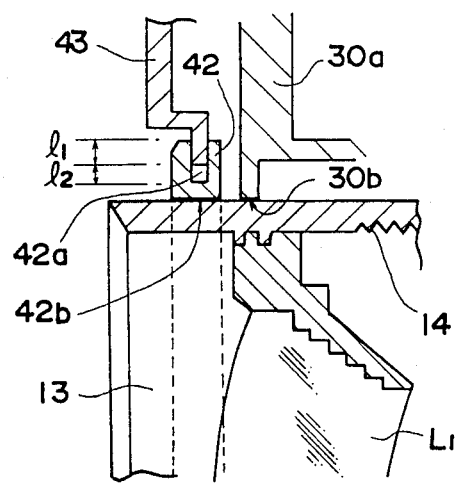
FIG. 4 is a fragmentary sectional view showing, in an enlarged scale, a specific example shown by FIG. 6.

Reference numeral 42 designates a floating ring provided so as to be in contact with the outer periphery of the focussing ring 13 at a position in front of the barrel receiving opening 30b of the support plate 30 and the inner edge of the circular opening formed in a face cover 43 to receive the lens mount assembly is slidably inserted into the outer periphery of said focussing ring 13. As shown in an enlarged scale by FIG. 4, this floating ring 42 has a complete circumferential groove 42a therearound and an inner peripheral surface 42b adapted to be in slidable contact with the outer periphery of the focussing ring 13. The inner edge of the opening formed in the face cover 43 to receive the lens mount assembly is slidably inserted into said groove 42a so that said inner edge of the opening comes short of the bottom of said groove 42a, i.e., a certain gap is left therebetween. Referring to FIG. 4, it is preferred to meet the requirement of $l_1 > l_2$.

In view of the fact that said floating ring 42 is provided as water-proof and dust-proof means, it is preferable to select an inner diameter of said floating ring 42 substantially corresponding to the outer diameter of the focussing ring 13. During movement of the focussing ring 13 along the optical axis, said floating ring 42 has its inner peripheral surface 42b being in slidable contact with the outer periphery of said focussing ring 13 and its groove 42a slidably holding the face cover 43 so that a possible variation in the distance between the inner edge of the opening formed in the said face cover 43 to receive the lens mount assembly and the outer periphery of the focussing ring 13 may be effectively accommodated by said gap defined in said groove.

Figure 7:
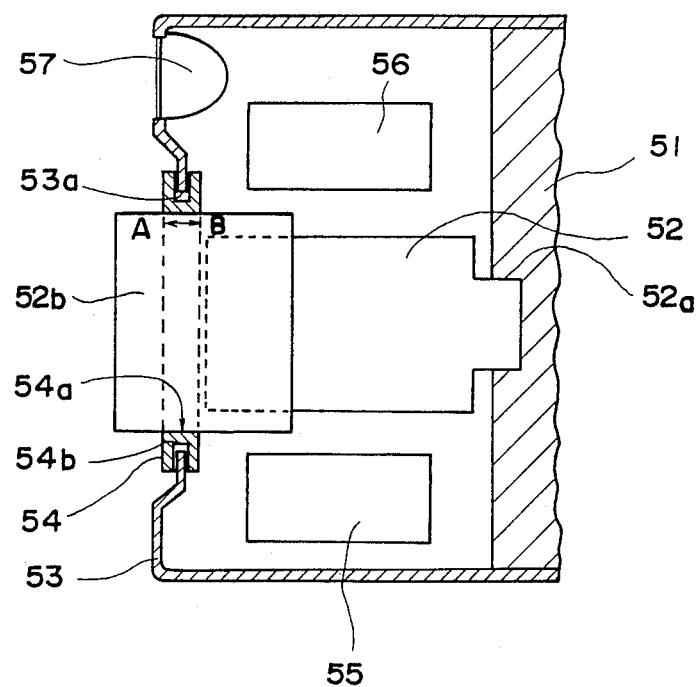
FIG. 7 is a side view showing, as partially broken away, further another embodiment.

FIG. 7 shows an embodiment of the present invention in which the lens mount assembly having no zooming function is provided with the floating ring as mentioned above. Referring to FIG. 7, reference numeral 51 designates a camera body, reference numeral 52 designates the lens mount assembly mounted on the camera body, reference numeral 52a designates a stationary barrel and reference numeral 52b designates a movable barrel of said lens mount assembly. Reference numeral 53 designates a face plate defined by the face cover or the like integrally attached to the camera body and reference numeral 53a designates an inner edge of an opening formed in said face plate 53. This opening is of a diameter slightly larger than the outer diameter of the lens mount assembly and adapted to receive said lens mount assembly. Reference numeral 54 designates a floating ring including an inner peripheral surface 54a adapted to be slidably in contact with the outer peripheral surface of the lens mount assembly and a circumferential groove 54b of square U-shape in cross-section adapted to slidably receive the inner edge 53a of the opening formed in the face plate 53 so that a small gap is left between said inner edge 53a and the bottom of said circumferential groove 54b. This floating ring 54 may be made of suitable material having a slight elasticity such as ABS resin.

Reference numeral 55 designates a battery, reference numeral 56 designates an electric motor and reference numeral 57 designates an illuminator such as a flash unit.

This embodiment functions as follows:

A distance between the lens mount assembly 52 and the inner edge 53a of the opening formed in the face plate 53 may vary due to tolerances, mounting errors and thermal expansions of these both components. Such variation may further increase as the movable barrel 52b of the lens mount assembly 52 is moved in a direction as indicated by an arrow AB, particularly when these both components are of plastic material.

First, it will be considered how the lens mount assembly 52 and the inner peripheral surface 54a of the floating ring 54 are slidably moved with respect to each other.

A dimensional variation occurring in the outer periphery of the lens mount assembly 52 is accommodated by an elastic dimensional variation occurring in the inner periphery of the floating ring 54.

A variation occurring in the distance between the outer periphery of the lens mount assembly 52 and the inner edge 53a of the opening formed in the face plate 53 is accommodated by the gap left within the circumferential groove 54b of the floating ring 54.

It should be noted here that the dust-proof mechanism as previously mentioned may be adopted also for the objective, the view-finder lens and the other lenses. For the eyepiece of the view-finder, it will be appreciated that a rear plate of the camera body corresponds to the face plate.

What is claimed is:

1. A lens mount assembly for an optical instrument having a body, said assembly comprising:
   a zooming mechanism comprising an optical system having a plurality of optical elements, a cam barrel, and a movable barrel movable along an optical axis in operative association with rotation of said cam barrel and thereby to change a relative position of respective optical elements of the optical system; said zooming mechanism further comprises a front optical assembly including a focussing mechanism having a rotatable barrel mounted on a front side of said movable barrel to displace the front optical assembly for focussing control; and
   a barrel supporting mechanism comprising a support member secured directly to the body of the optical instrument so as to project forward from said body of the optical instrument, said support member having a receiving opening for slidably receiving the rotatable barrel of said lens mount assembly.

2. A lens mount assembly as recited in claim 1, wherein said focussing mechanism comprises a focussing gear provided on the rotatable barrel; a focussing drive unit including coupling gears adapted to engage said focussing gear; and an electric motor adapted to drive said coupling gears mounted on said support member.

3. A lens mount assembly as recited in claim 2, wherein said zooming mechanism comprises a zooming gear mounted on the cam barrel; a zooming drive unit including coupling gears adapted to engage said zooming gear and an electric motor adapted to drive said coupling gears.

4. A lens mount assembly for an optical instrument having a body, said lens mount assembly comprising:
   a lens assembly having an outer peripheral surface; and
   a dust-proof mechanism which comprises a front cover having an opening with its inner peripheral edge closely surrounding the outer peripheral surface of said lens assembly, and a floating ring interposed between the outer peripheral surface of said lens assembly and said inner peripheral edge of said opening formed in said front cover, wherein said floating ring has an inner peripheral surface and an outer peripheral surface, the inner peripheral surface being in slidable contact with said outer peripheral surface of said lens assembly, and wherein a circumferential groove is formed in said ring outer peripheral surface for slidably receiving said inner peripheral edge of said opening but with a gap left therebetween.

5. A lens mount assembly comprising a zooming mechanism which comprises an optical system having a plurality of optical elements, a cam barrel, and a movable barrel movable along an optical axis in operative association with rotation of said cam barrel thereby to change a relative position of respective elements of the optical system; said zooming mechanism further comprising a front optical assembly including a focussing mechanism having a rotatable barrel mounted on a front side of said movable barrel to displace the front optical assembly for focussing control; a support member having a receiving opening for slidably receiving said rotatable barrel; and a dust-proof mechanism which comprises a front cover having an opening with its inner peripheral edge closely surrounding the outer periphery of said rotatable barrel, and a floating ring interposed between the outer periphery of said rotatable barrel and said inner peripheral edge of said opening formed in said front cover, wherein said floating ring has an inner peripheral surface and an outer peripheral surface, the inner peripheral surface being in slidable contact with said outer peripheral surface of said rotatable barrel, and wherein a circumferential groove is formed in said outer peripheral surface of the ring for slidably receiving said inner peripheral edge of said opening but with a gap left therebetween.

6. A lens mount comprising:

a lens assembly having a movable front barrel;

support means for supporting the periphery of the front barrel, the support means comprising a frame having an opening through which the front barrel slidably extends thereby supporting the periphery of the front barrel; and a cover disposed in front of the opening of the support means, the cover having an opening through which the front barrel extends in sliding engagement and a floating ring disposed between the periphery of the opening of said cover and the periphery of the front barrel.

7. A lens mount as in claim 6 wherein a groove is provided on the floating ring for receiving the periphery of the opening of the cover thereby to retain the floating ring in said opening, the groove having a depth such that the bottom of the groove is spaced from the periphery of the opening of the cover so as to enable the floating ring to move laterally in the plane of the cover within said opening.

* * * * *